Jan. 17, 1933.   E. STROUD   1,894,915
LUMINAIR
Filed Feb. 21, 1931   3 Sheets-Sheet 1

INVENTOR
*Ernest Stroud*
BY
ATTORNEY

Jan. 17, 1933.  E. STROUD  1,894,915
LUMINAIR
Filed Feb. 21, 1931  3 Sheets-Sheet 2
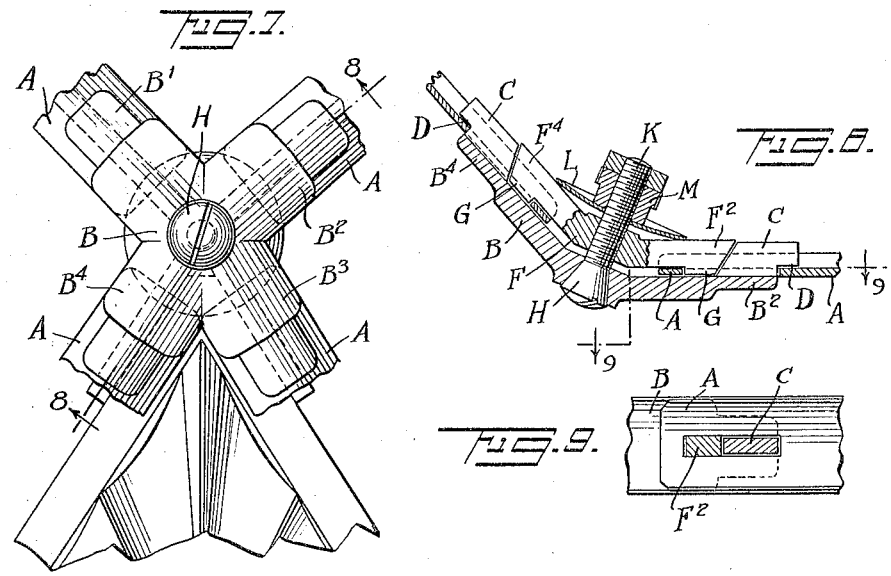
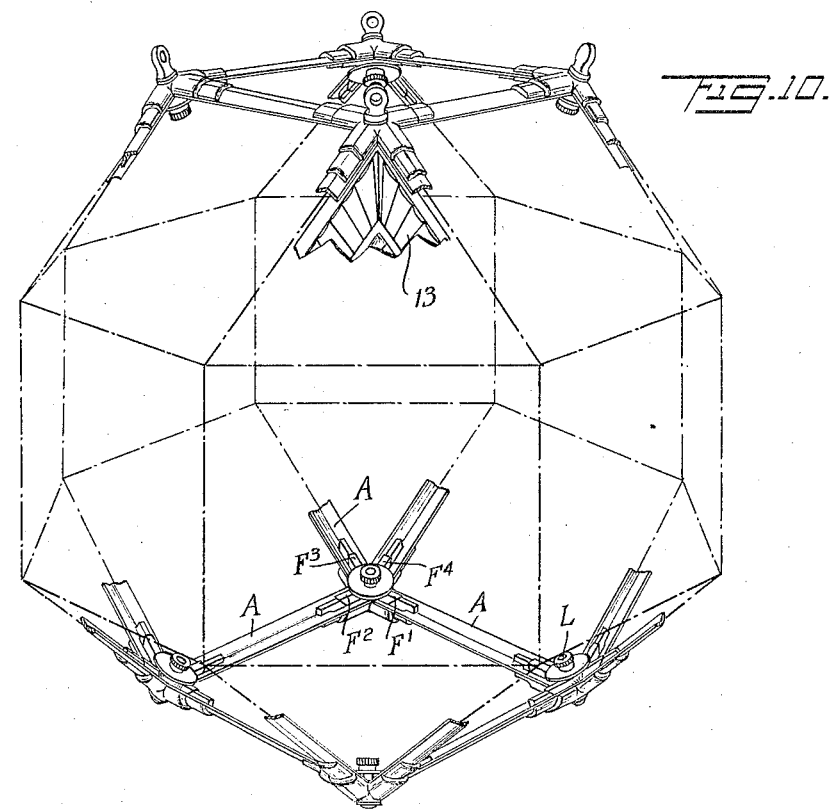
INVENTOR
Ernest Stroud
BY
ATTORNEY

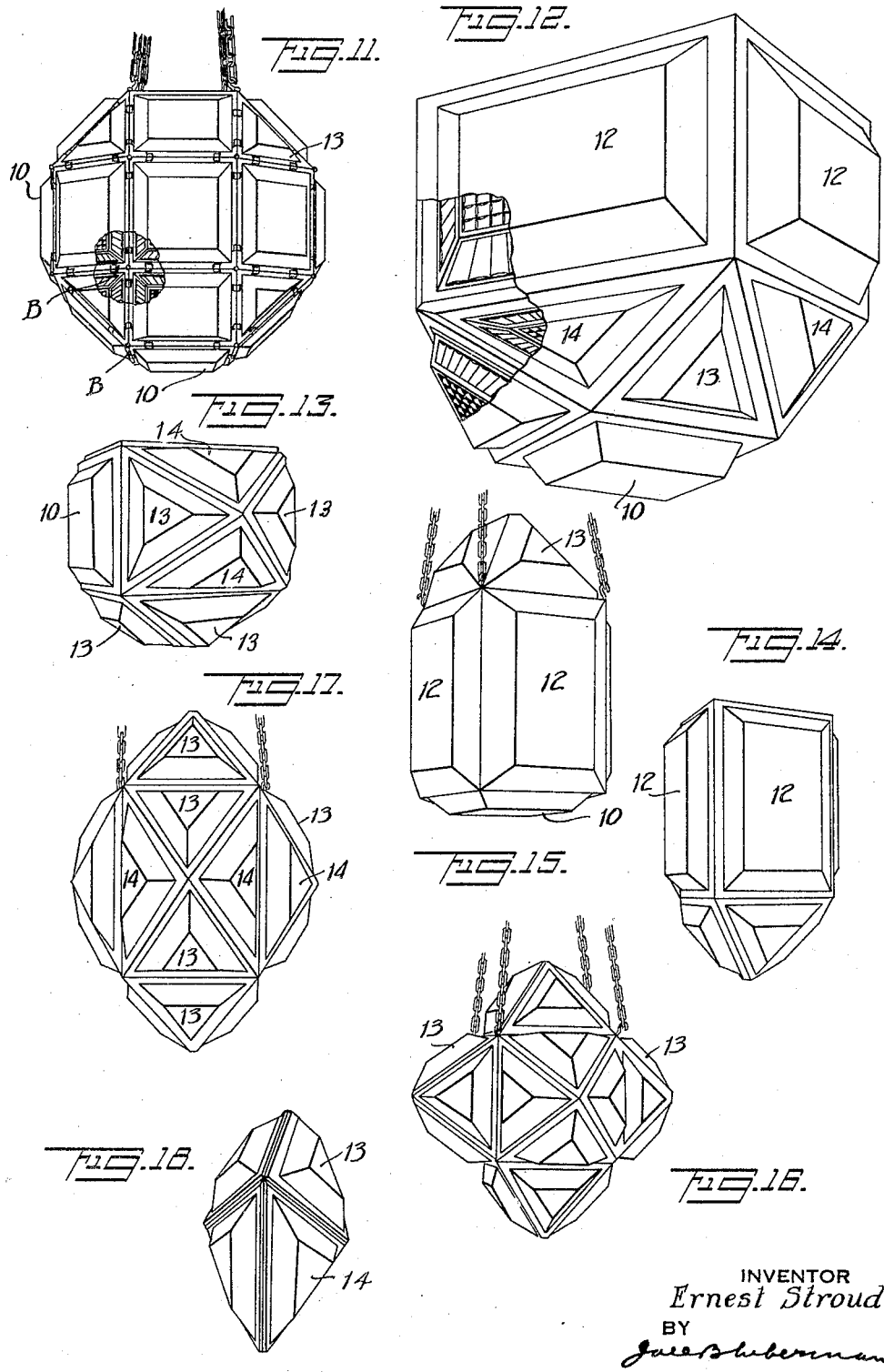

Patented Jan. 17, 1933

1,894,915

UNITED STATES PATENT OFFICE

ERNEST STROUD, OF LONDON, ENGLAND

LUMINAIR

Application filed February 21, 1931, Serial No. 517,393, and in Great Britain March 4, 1930.

This invention relates to luminairs employing reflecting and diffusing fittings for illuminating purposes, and more particularly to reflectors, shades, or globes made of reflecting and diffusing glass moulded or pressed with prisms or other continuous designs depressed or in relief and formed on one or both surfaces.

Large reflectors and bowls have been moulded from prismatic glass, but the operation of pressing the glass is difficult in the larger sizes, and moreover if such a fitting is broken, the whole of it has to be replaced. One of the chief objects of the present invention is to enable prismatic fittings of various designs to be built up of relatively small reflecting and diffusing plates. The use of such small plates reduces considerably the difficulty in handling the glass and naturally renders the cost of the moulds very much less, and moreover it enables an exceedingly large number of fittings of different designs to be assembled from a very small number of standard glass plates, while in addition, if by accident a part of the fitting is broken, only the glass plate which has suffered has to be replaced.

According to the present invention, a reflecting or diffusing fitting for illuminating purposes is built up of a number of flat or substantially flat glass plates moulded or pressed with prisms on one or both of their surfaces, and the plates are given the shape of two or more different geometrical figures bounded by straight edges, and the plates are mounted and assembled in a supporting framework. Conveniently the plates may have the shapes of squares, rectangles, and triangles, and as a matter of fact, by the use of a relatively small number of such shapes, for example six, comprising squares of two sizes, rectangles, equilateral triangles of two sizes, and right-angled triangles, an almost infinite number of designs may be built up. Designs may be built up by using square plates, rectangular plates having one side the same length as the square plates, and right-angled triangular plates, the two shorter sides of which are the same length as the shorter side of the rectangles and the longer side of which is the same length as the sides of the squares. The solid figures made into shades and reflectors in this way may be still further elaborated by embodying in addition equilateral triangles, the sides of which are equal to the sides of square plates and the shorter sides of rectangular plates. The plates may actually be flat except for the prisms on one or both plates, or dished or bulged outwards or inwards.

The invention contemplates that the glass plates of geometric form shall be carried in a suitable framework or skeleton designed to support the glass parts without interferring with the transmission of light. The invention aims at providing a simple form of framework for that purpose, and for other illuminating fittings assembled in sections. The invention further aims at providing a framework which may be easily assembled and taken to pieces, may be cheap to manufacture yet is perfectly rigid and strong, and forms an efficient support for the sections of the fitting.

In a fitting in which glass plates are assembled to form geometrical figures, the corners or angles of the fitting consist of points at which a number of such plates meet, and the present invention consists in employing at such corners a coupling member with a suitable number of radial arms and means for locking to these radial arms the side members of the framework which serve to support the edges of the glass plates. The member at each angle or corner is preferably a casting with radial arms to receive the lateral members of the framework, and coacting with the member is a further clamping member arranged to bear upon the lateral members of the frame and to hold those firmly in position.

In order that the invention may be clearly understood and readily carried into effect, a number of forms of lightning fittings for use with electric incandescent lamps, and constructed in accordance with the invention, together with one form of framework, will now be described more fully with reference to the accompanying drawings, wherein:

Figure 7 is an elevational view of a corner or a joint of the framework, viewed directly from the front of the joint;

Figure 8 is a longitudinal section through the joint taken on the line 8—8 of Figure 7;

Figure 9 is a section taken on the line 9—9 of Figure 8;

Figure 10 is a perspective view on a reduced scale of a complete luminair employing the joint of Figures 7 to 9 and square and equilateral triangular plates;

Figure 11 is a front perspective view of a hanging unit of octagonal shape employing square plates and equilateral triangular plates;

Figure 12 is a perspective view of a ceiling type fitting employing square plates, rectangular plates, equilateral plates and right-angled triangular plates; and Figures 13 to 18 inclusive are diagrammatic views illustrating in outline various shapes of luminair employing the plates of Figures 1 to 6, the glass only being indicated.

Figure 1:
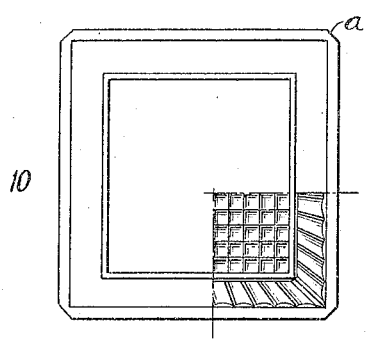
Figures 1 to 6 are front views showing outline shapes for plates which may be employed and indicating in fragmentary fashion a portion of a design which may be applied to each plate.
Figure 4:
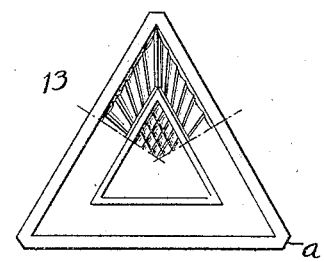
Figure 3:
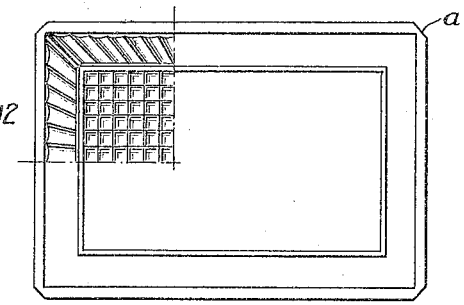
Figure 5:
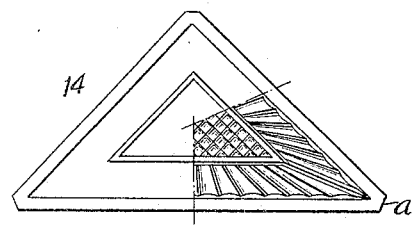
Figure 2:
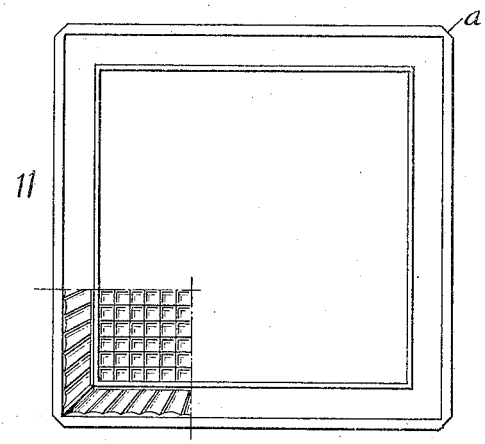
Figure 6:
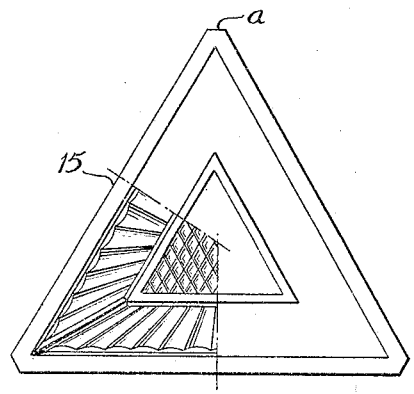

The plates illustrated in Figures 1 to 6 are as follows: In Figure 1 the plate 10 is a small square except for the extreme corners cut off at $a$. The plates are not actually flat but are substantially so, being in the form of shallow dishes, and in the example illustrated ribs or prisms are moulded both on the inner and outer surfaces. The latter remark applies to the remaining plates which only differ from that shown in Figure 1 in regard to the configuration of the outer boundaries. Figure 2 shows a larger square plate; in fact the length of the sides of the square in Figure 2, including the short pieces cut away at the corners, is made in a ratio of $\sqrt{2}$ to those in Figure 1 for a purpose which will appear later. In Figure 3 a rectangular plate 12 is shown, the shorter sides of which are equal to the sides of the small square in Figure 1, and the longer sides of which are equal to the sides of the larger square shown in Figure 2. In Figure 4 the plate 13 has the form of an equilateral triangle, the length of its sides, taking into consideration the parts cut off at the corners, is equal to the short sides of the rectangle in Figure 3, that is, the sides of the smaller square shown in Figure 1. The shape 14 shown in Figure 5 is that of a right-angled triangle, the sides containing the right-angle being equal in length to those of the small square of Figure 1, and from what has been said above, it will be seen that the long side is equal in length to the side of the larger square shown in Figure 2. In other words, the sides of the plate 14 in Figure 5 are the same as the sides of the rectangular plate in Figure 3. It will be appreciated that in this way the longer side can fit against the longer side of a rectangular plate according to Figure 3, or against a square plate as shown in Figure 2, while the shorter sides can fit against the shorter side of a rectangular plate according to Figure 3, or the side of a smaller square shown in Figure 1. Figure 6 shows an equilateral triangular plate 15 whose sides are equal to the sides of the larger square plate.

The framework of the fitting illustrated consists of a number of V-shaped angle-section metal strips A, and in the particular form of fitting illustrated, joints are required as illustrated in Figure 7 in which the angle between the uppermost strips is 90 degrees as is also the angle between the two strips on the right and the two strips on the left, while that between the lowermost two strips A is 60 degrees. The joint therefore can connect the strips at the corner where three squares and an equilateral triangle meet.

The cast boss B, which if desired, although not shown, may be ornamented on the outside, is provided for the corner in question, and a similar boss suitably modified where necessary to accommodate different angles is employed at the other corners of the fitting. The boss B has four radial arms $B^1$, $B^2$, $B^3$ and $B^4$ cast with it, each of angular section, as seen in Figures 2 and 3, with the result that the end of one of the strips A will bed into each of the arms $B^1$, $B^2$, $B^3$, $B^4$.

Each of the short arms $B^1$, $B^2$, $B^3$ and $B^4$ at its outer end has a rib C projecting inwardly and the radial outer end of each rib C consists of a short projecting or overhanging lug D. Each metal strip A is formed near each end with a slot E of a length slightly greater than that of the rib C so that the strip A can be pressed down over the rib C as shown in Figure 3, and then slid radially inwards towards the centre of the boss B so that the projecting lug D engages over the centre line of the strip A as seen in Figure 8 and prevents the strip A lifting away from the radial arm $B^1$, $B^2$, $B^3$ or $B^4$. The four strips A which meet at a joint or corner are thus placed in position over their respective ribs C and are then held in that position by a small spider F which also may be a casting, and has four radial arms $F^1$, $F^2$, $F^3$ and $F^4$ at the same angles as the arms of the boss B. Each of the arms $F^1$, $F^2$, $F^3$ and $F^4$ has at its end a projection G extending out of its plane and so arranged that when the spider F is placed in position, it can extend into the inner end of the slot E in the respective strip A since the inner end of the slot E is exposed when the strip is slid inwards under the extending lug D and the retaining rib C.

The spider F being thus placed in position, will, when held firmly in conjunction with the lugs D on the retaining ribs C, prevent any appreciable rocking motion of the strips A forming the framework of the illuminating fitting. The ribs C and the projections G on the end of the arms of the spider F will prevent any movement of the angular strips A radially to or from the centre of the boss B.

The spider F may be secured in its position against the inner surface of the boss B in any desired manner. For example, as shown in the drawings, the boss B is drilled centrally and formed with a conical hole to receive the conical head H of a screw K. The spider F is drilled with a corresponding central hole which is tapped so that the screw K can be screwed into it from outside the boss B in order to clamp the two together and render the whole fitting rigid. It is preferred to place a thin soft washer L, either of brass or copper, over the screw K and to retain same in position by the milled nut M screwed on from the inside of the fitting. The washer L and the nut M serve primarily to hold the glass plates in position but the nut M also serves as a lock nut. At the four uppermost corners N, the screws K with the slotted heads H may be replaced by screws K¹ with conical heads and projecting eyes as shown, to receive the hooks on the suspension chains for the fitting.

Figures 11 to 18 show a few of the various forms of luminair which are made up out of the various plates and fittings above referred to. Figure 11 shows an octagonal fitting composed of squares such as 10 or 11 and equilateral triangles such as 13 or 15. The glass parts are supported in corner pieces or fittings B as shown and described above in detail.

Figure 12 illustrates yet a further form of luminair using plates of five different sizes. In plan view this bowl is a square, the size of which is the same as the large square plate shown in Figure 2; such a plate may close the top, although it does not appear at the angle of this figure. There are depending from the sides of this large square four rectangular plates 12, as shown in Figure 3, and projecting vertically down from the lower sides of these rectangles are four plates 14 which have the shape of right-angled triangles and the dimensions shown in Figure 5. The corner spaces between the plates 14 are filled in by equilateral triangular plates 13 having the shape and dimensions of the plates shown in Figure 4, while finally the bowl is closed at the bottom by a plate 10 which is a small square as shown in Figure 1. This bowl again may be supported in a framework of strip brass and carried from a ceiling fitting or the like by chains or rods.

In Figure 13 the bowl consists of square panels 10 and equilateral triangular panels 13, and right-angled triangular panels 14.

In Figure 14 the hanging lantern consists of rectangular panels 12, square panels 10 and equilateral triangular panels 13. The close ceiling type shown in Figure 14 employs the same parts as shown in Figure 15, except the square panels, and the entire unit is inverted.

Figure 16 is a 6-pointed star arrangement made up entirely of equilateral triangles. This may be used as a hanging fitting or the pyramid formed by the upper triangular pieces may be omitted to make a ceiling type unit or a bracket.

Figure 17 shows a 6-pointed rectangular star utilizing right-angles triangular panels 14 and equilateral triangular panels 13.

Figure 18 shows a wall bracket made up of equilateral triangular plates 13, and right-angled triangular panels 14.

It will, of course, be understood that the various joints employed in the various corners of the luminairs will be constructed to fit the various angular relations of the plates as they are assembled. A few of these angles are indicated by the shapes given in the drawings. The angles are all readily ascertained and, inasmuch as the number of styles of corner pieces or joints necessary is comparatively small, it will be obvious that a small number of casting designs is all that will be necessary to permit making up a wide variety of assemblies. The strips A may all be alike, except for length and angle, there being strips whose length corresponds with the short squares and other strips whose length corresponds with the larger squares.

It is, of course, to be understood that the assembly of the various forms of luminair out of the small number of standard plates may be accomplished on frames of various types and that the form of frame herein shown in but one of the many forms which may be utilized to support the glass panels.

From the foregoing it will be apparent that great flexibility of design is possible with a very small number of plates of geometrical shapes indicated together with a small number of corner pieces and straps. The luminairs may be shipped without assembly and subsequently assembled as desired. It will also be understood that ranges of various sizes may readily be had if one employs the large square of one range of sizes as the small square for the range of the next larger size.

I claim:

1. A reflecting or diffusing fitting for illuminating purposes built up of a number of flat or substantially flat glass plates moulded or pressed with prisms or ribs on one or both of their surfaces, the said glass plates being made in the shape of two or more different geometrical figures, each bounded by straight sides and being mounted and assembled in fixed relation, the edges of each plate being in a single plane and the body of the plate being bulged out of said plane.

2. A reflecting or diffusing fitting for illuminating purposes built up of a number of flat or substantially flat glass plates moulded or pressed with prisms or ribs on one or both of their surfaces, the said glass plates being made in the shape of two or more different geometrical figures, including squares, rectangles and triangles, each bounded by straight sides and being mounted and assembled in fixed relation, the rectangular and triangular plates having sides whose lengths equal the sides of the square plates, the edges of each plate being in a single plane and the body of the plate being bulged out of said plane.

3. A reflecting or diffusing fitting for illuminating purposes built up of a number of flat or substantially flat glass plates moulded or pressed with prisms or ribs on one or both of their surfaces, the said glass plates being made in the shape of two or more different geometrical figures, including squares, rectangles and triangles, each bounded by straight sides and being mounted and assembled in fixed relation, the rectangular and triangular plates having sides whose lengths equal the sides of the square plates, the edges of each plate being in a single plane and the body of the plate being bulged out of said plane, the rectangular and certain of the triangular plates having sides of equal length.

4. A glass fitting for illuminating purposes according to claim 1, wherein the substantially flat glass plates are supported along their straight edges by the members of a supporting framework consisting of bars of strip metal radiating from the angles of the fitting and comprising flat strips.

5. A system of interchangeable glass plates for assembling luminairs of various forms and shapes including a plurality of plates each having its edges in a plane and of geometrical shape, the shaped including squares of two sizes which bear the relation of $\sqrt{2}$, equilateral triangles of two sizes fitting the squares, and right-angles triangles and rectangles each having sides fitting squares or equilateral triangles of both sizes.

6. A glass plate for assembling luminairs having geometrical shape, said plate being square and having its edges in one plane and its body bulged out of that plane.

7. A glass plate for assembling luminairs having geometrical shape, said plate being of equilateral triangular shape and having its edges in one plane and its body bulged out of that plane.

8. A glass plate for assembling luminairs having geometrical shape, said plate being of isosceles right-angled triangular shape having its edges in one plane and its body bulged out of that plane.

9. A glass plate for assembling luminairs having geometrical shape, said plate being of rectangular shape with its sides having the relation of $\sqrt{2}$.

10. A luminair comprising, a plurality of corner pieces each having short, narrow arms radiating from a common center, strips detachably connected at their ends to the short arms of the corner pieces to form a framework of the form of a solid geometrical figure, glass panels removably carried within the framework with their edges covered by the strips, and securing means carried by the corner pieces and acting on the corners of the glass panels for securing the panels in place.

11. A joint for a framework for illuminating fittings including metal strips meeting at a number of angles or corners of the framework, said joint consisting of a coupling member with a number of radial arms, and a locking device for securing the respective strips, which meet at a given angle or corner, to the radial arms of the coupling member.

12. A joint for a framework for illuminating fittings including metal strips meeting at a number of angles or corners of the framework, said joint consisting of a coupling member with a number of radial arms, and a locking device for securing the respective strips, which meet at a given angle or corner, to the radial arms of the coupling member, the metal strips being clamped against the inner surface of the arms of the coupling member for securing the panels in place.

13. A joint for a framework for illuminating fittings including metal strips, meeting at a number of angles or corners of the framework, said joint consisting of a coupling member with a number of radial arms, a spider having similarly disposed arms, the ends of the strips being interlocked between the spider arms and the arms of the coupling member, and means for securing the spider to the coupling member.

14. A framework for illuminating fittings having corner devices each adapted to receive a plurality of glass plates of geometric shape to form a corner of a solid geometric figure, the corner devices including corner members having radial arms, strips secured to the radial arm of the corner pieces, and clamping devices carried by each corner member and acting on the ends of the strips to secure them to the corner members.

15. A joint for illuminating fittings comprising a corner piece having short radial arms each having an inwardly projecting rib, a spider member disposed within the corner member and having arms corresponding in number and angular relation with those of the corner member, the spider arms having outwardly projecting ribs adjacent the ribs on the arms of the corner members, and straps each having slots to receive a rib on the corner member and a rib on the spider, and means to clamp the strips in place.

16. A luminair comprising a self-sustaining framework including corner and edge forming members defining a polyhedron whose faces include triangles and right-angled quadrilaterals, and glass panels fitting the frame-work, the panels being composed of ribbed transmitting glass and being outwardly convexed to scatter the light and illuminate the interposed edge forming members of the frame.

17. A plate for illuminating fittings comprising a single piece of ribbed transmitting glass of simple geometric shape and having its edges in one plane, the interior of the plate having a raised area of the same shape as the plate but reduced in area and connected at its edges with the edges of the plate by sloping portions.

Signed in the county of London, England, this 2nd day of February, 1931.

ERNEST STROUD.